(12) United States Patent
Guzman

(10) Patent No.: US 10,608,579 B1
(45) Date of Patent: Mar. 31, 2020

(54) FOLDABLE SOLAR POWERED AND RECHARGEABLE POWER BANK WITH LIGHT EMITTING DIODES

(71) Applicant: Rudy Guzman, San Antonio, TX (US)

(72) Inventor: Rudy Guzman, San Antonio, TX (US)

(*) Notice: Subject to any disclaimer, the term of this patent is extended or adjusted under 35 U.S.C. 154(b) by 0 days.

(21) Appl. No.: 16/101,455

(22) Filed: Aug. 12, 2018

(51) Int. Cl.
 *H02S 10/40* (2014.01)
 *H02S 30/20* (2014.01)
 *H02S 40/34* (2014.01)
 *H02J 7/35* (2006.01)
 *H02S 40/38* (2014.01)
 *H02J 7/00* (2006.01)

(52) U.S. Cl.
 CPC ............ *H02S 30/20* (2014.12); *H02J 7/0027* (2013.01); *H02J 7/35* (2013.01); *H02S 10/40* (2014.12); *H02S 40/34* (2014.12); *H02S 40/38* (2014.12); *H02J 2007/0062* (2013.01)

(58) Field of Classification Search
 CPC ... H02S 10/40; H02S 30/20; H02J 2007/0062
 See application file for complete search history.

(56) References Cited

U.S. PATENT DOCUMENTS

| | | | |
|---|---|---|---|
| 2010/0282298 A1* | 11/2010 | Chen | G06F 1/1616 136/246 |
| 2019/0149084 A1* | 5/2019 | Williams | H04M 1/02 136/251 |

* cited by examiner

*Primary Examiner* — Magali P Slawski
(74) *Attorney, Agent, or Firm* — The Iwashko Law Firm, PLLC; Lev Ivan Gabriel Iwashko

(57) ABSTRACT

A power bank to recharge a mobile device battery, the power bank including a first panel, including a battery, at least one universal serial bus (USB) port connected to the battery to provide a charge to the mobile device battery when the mobile device battery is connected to the USB port, a second panel electrically connected to the first panel at a first side of the second panel, the second panel including a solar panel electrically connected to the battery to allow the battery to be charged when the solar panel receives light from a light source, and a third panel electrically connected to the second panel at a second side of the second panel to be foldable with respect to the second panel such that a front surface of the third panel may optionally contact a front surface of the second panel, the third panel including a plurality of light emitting diodes (LEDs) disposed on the front surface of the third panel to emit a light therefrom such that the solar panel extracts energy from the light when the front surface of the third panel contacts the front surface of the second panel.

3 Claims, 2 Drawing Sheets

FOLDABLE SOLAR POWERED AND RECHARGEABLE POWER BANK WITH LIGHT EMITTING DIODES

BACKGROUND

1. Field

The present general inventive concept relates generally to a power bank, and particularly, to a foldable power bank that is rechargeable using a solar panel and light emitting diodes.

2. Description of the Related Art

As handheld electronic mobile devices become more prevalent, the responsibility of charging them can become a hassle for many users. Currently, there are various chargers available on the market, but they require access to an electrical outlet.

Alternatively, there are also various portable power banks available for charging these mobile devices, but power banks include batteries that also require recharging in order to be able to provide recharge power to the mobile devices.

Therefore, there is a need for a power bank that does not require an electrical outlet to recharge a battery disposed within the power bank.

SUMMARY

The present general inventive concept provides a foldable power bank that is rechargeable using a solar panel and light emitting diodes.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a power bank to recharge a mobile device battery, the power bank including a first panel, including a battery, at least one universal serial bus (USB) port connected to the battery to provide a charge to the mobile device battery when the mobile device battery is connected to the USB port, a second panel electrically connected to the first panel at a first side of the second panel, the second panel including a solar panel electrically connected to the battery to allow the battery to be charged when the solar panel receives light from a light source, and a third panel electrically connected to the second panel at a second side of the second panel to be foldable with respect to the second panel such that a front surface of the third panel may optionally contact a front surface of the second panel, the third panel including a plurality of light emitting diodes (LEDs) disposed on the front surface of the third panel to emit a light therefrom such that the solar panel extracts energy from the light when the front surface of the third panel contacts the front surface of the second panel.

The first panel may be foldable with respect to the second panel such that a rear surface of the third panel may optionally contact a rear surface of the second panel.

The first panel further may include a power button disposed on a front surface of the first panel to allow the battery to provide power to the plurality of LEDs when the power button is depressed.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
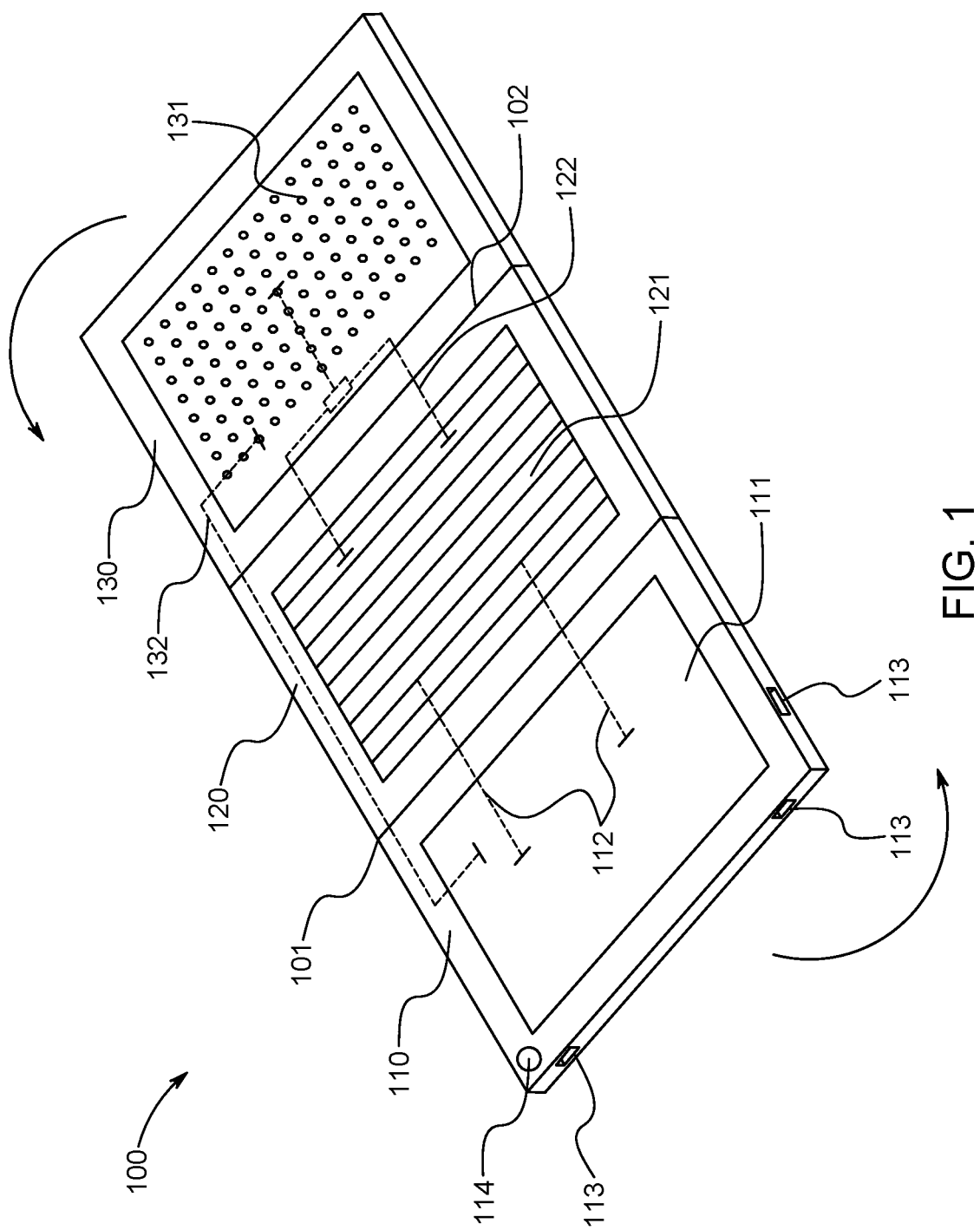
FIG. 1 illustrates a top angled perspective view of a power bank in an unfolded position, according to an exemplary embodiment of the present general inventive concept.

FIG. 1 illustrates a top angled perspective view of a power bank 100 in an unfolded position, according to an exemplary embodiment of the present general inventive concept.

The power bank 100 may be constructed from metal, plastic, glass, wires, ceramic, rubber, wood, etc., but is not limited thereto.

As illustrated in FIG. 1, the power bank 100 may include a first panel 110, a second panel 120, and a third panel 130, but is not limited thereto.

The second panel 120 may be a center panel of the power bank 100, and the first panel 110 may be disposed at and connected to a first side of the second panel 120, while the third panel 130 may be disposed at and connected to a second side of the second panel 120.

The first panel 110 may include a battery 111, first wiring 112, at least one universal serial bus (USB) port 113, and a power button 114, but is not limited thereto.

The second panel 120 may include a solar panel 121, second wiring 122, and the first wiring 112, but is not limited thereto.

The third panel 130 may include a plurality of light emitting diodes (LEDs) 131, the second wiring 122, and a third wiring 132, but is not limited thereto.

Therefore, the first wiring 112 may electrically connect the battery 111 of the first panel 110 to the solar panel 121 of the second panel 120.

Likewise, the second wiring 122 may electrically connect the solar panel 121 to the plurality of LEDs 131.

As such, the first wiring 112 and the second wiring 122 may provide an electrical connection between the battery 111 and the plurality of LEDs 131 via the solar panel 121, to provide power thereto.

Alternatively, the third wiring 132 may be optionally provided to provide a direct electrical connection between the battery 111 and the plurality of LEDs 131.

The battery 111 may be charged when the solar panel 121 is exposed to a light source, such as the sun (or any other light source), such that the solar panel 121 harnesses (i.e., extracts) energy from the light to provide power (and a recharge) to the battery 111.

Figure 2:
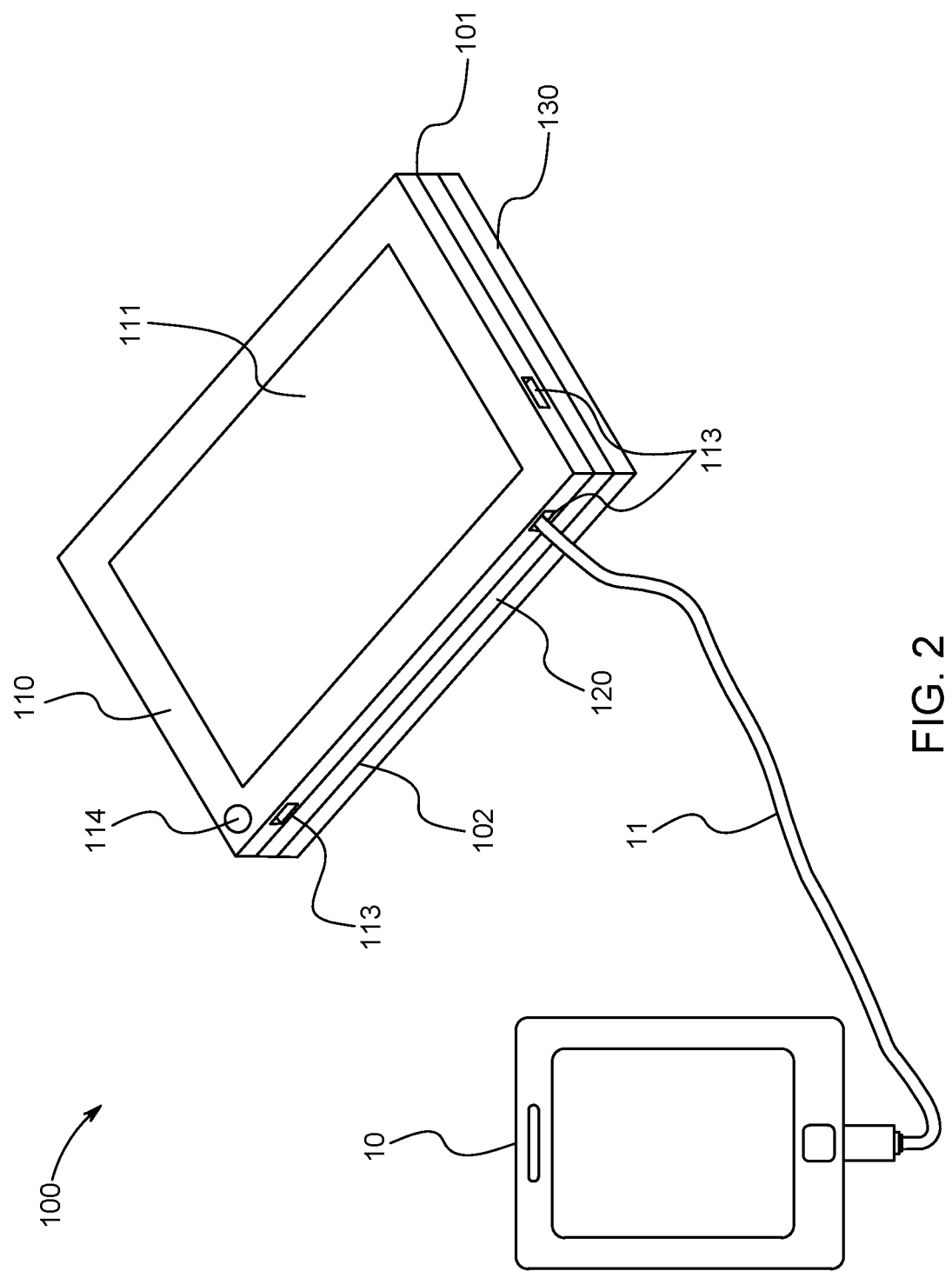
FIG. 2 illustrates a top angled perspective view of the power bank in a folded position, according to an exemplary embodiment of the present general inventive concept.

The battery 111 may be connected to the USB port 113 to allow a mobile device 10 (as illustrated in FIG. 2), such as a cellular telephone, tablet computer, etc., to be charged via a USB cord 11. The mobile device 10 inherently includes a battery that provides power to the mobile device 10, which actually is the component that requires a recharge.

The solar panel 121 may also provide power to the plurality of LEDs 131 when the solar panel 121 is exposed to the sun, such that the plurality of LEDs 131 may be turned on using the power button 114.

FIG. 2 illustrates a top angled perspective view of the power bank 100 in a folded position, according to an exemplary embodiment of the present general inventive concept.

Referring to FIGS. 1 and 2, the first panel 110 may be folded downward and towards a rear surface of the second panel 120, such that a rear surface of the first panel 110 contacts the rear surface of the second panel 120. Likewise, the third panel 130 may be folded upward and towards a front surface of the second panel 120, such that a front surface of the third panel 130 contacts the front surface of the second panel 120. When the first panel 110 and the third panel 130 are folded to contact the second panel 120, the power bank 100 is in a folded position.

When the power bank 100 is in the folded position, the power button 114 may be depressed to allow the battery 111 to provide power to the plurality of LEDs 131, which are in contact with the solar panel 121, such that the plurality of LEDs 131 emit light therefrom. When the plurality of LEDs 131 emit light therefrom, the solar panel 121 may absorb the light from the plurality of LEDs 131, and then may provide a charge/recharge to the battery 111. When the battery 111 is charging, an indicator light (not illustrated) may be turned on (or blink) to indicate that the battery 111 is charging. When the battery 111 is fully charged, the indicator light (not illustrated) may be turned off and/or on to indicate that the battery 111 is fully charged.

When the battery 111 is fully charged, the power button 114 may be depressed again to turn off the plurality of LEDs 131. Alternatively, when the battery 111 is fully charged, the battery can control the plurality of LEDs 131 to turn off automatically.

As such, the battery 111 may be charged even when there is no other light source, such as the sun, exposed to the solar panel 121. In other words, the battery 111 may be charged in the dark using the plurality of LEDs 131.

Furthermore, the plurality of LEDs 131 may be turned on to provide light to the solar panel 121 to charge the battery 111 while the battery 111 provides recharging power to the mobile device 10 via the USB cord 11.

The indicator light may also be tuned on when the solar power 121 is extracting energy from an alternative light source.

Alternatively, the mobile device 10 may be set on top of the battery 111 of the power bank 100 in order to wirelessly receive a charge therefrom.

The power bank 100 may also include circuitry including a processor, a storage unit, a communication unit, or any other component to allow the power bank 100 to function properly.

The power bank 100 may be designed as a power-looping device, such that the plurality of LEDs 131 may provide light to the solar panel 121, such that the solar panel 121 extracts energy from the light to recharge the battery 111, while the battery 111 charges the mobile device 10 and provides further power to the plurality of LEDs 131.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A power bank to recharge a mobile device battery, the power bank comprising:
   a first panel, comprising:
      a battery,
      at least one universal serial bus (USB) port connected to the battery to provide a charge to the mobile device battery when the mobile device battery is connected to the USB port;
   a second panel electrically connected to the first panel at a first side of the second panel, the second panel comprising:
      a solar panel electrically connected to the battery to allow the battery to be charged when the solar panel receives light from a light source; and
   a third panel electrically connected to the second panel at a second side of the second panel to be foldable with respect to the second panel such that a front surface of the third panel may optionally contact a front surface of the second panel, the third panel comprising:
      a plurality of light emitting diodes (LEDs) disposed on the front surface of the third panel to emit a light therefrom such that the solar panel extracts energy from the light when the front surface of the third panel contacts the front surface of the second panel.

2. The power bank of claim 1, wherein the first panel is foldable with respect to the second panel such that a rear surface of the third panel may optionally contact a rear surface of the second panel.

3. The power bank of claim 1, wherein the first panel further comprises:
 a power button disposed on a front surface of the first panel to allow the battery to provide power to the plurality of LEDs when the power button is depressed.

\* \* \* \* \*